Figure 1A:
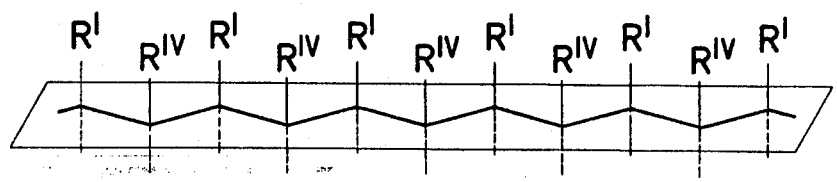

United States Patent Office 3,262,921
Patented July 26, 1966

3,262,921
POLYMERS OF UNSATURATED HALOGENATED ETHERS HAVING A HIGHLY STEREOREGULAR STRUCTURE AND PROCESS FOR PREPARING THE SAME
Giulio Natta, Mario Farina, Giancarlo Bressan, and Mario Peraldo, all of Milan, Italy, assignors to Montecatini-Società Generale per l'Industria Mineraria e Chimica, Milan, Italy, a corporation of Italy
Filed May 15, 1961, Ser. No. 129,916
Claims priority, application Italy, May 17, 1960, 8,756/60
9 Claims. (Cl. 260—91.1)

The present invention relates to polymers of halogenated unsaturated ethers having a high steric regularity and to a process for preparing the same.

The synthesis of polymers possessing a high regularity of structure from monomers having the general formula

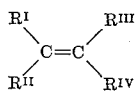

has been described in a copending United States patent application Serial No. 859,041, filed December 11, 1959, by three of the present applicants. The disclosure of this application is therefore incorporated herein by reference, and the values for $R^I$, $R^{II}$, $R^{III}$ and $R^{IV}$ are as given in said application. These monomers of the above formula can exist in cis and trans isomeric forms and thus, upon polymerization, they give polymers whose main chain contains two tertiary carbon atoms, and thus exist in diastereoisomeric forms, as described in Serial No. 859,041.

In this same patent application, examples of polymers of this above type are reported, such as those obtained from a monomer such as α-deutero-β-methyl ethylene ($CH_3$—CH=CHD), also designated as 1-deutero-propylene.

From the cis and trans forms of this type of monomer, two different polymers are obtained in which polymers a structure designated by us as "di-isotactic" (i.e., a structure in which steric orders of the isotactic type can be identified for each of the two series of differently substituted tertiary carbon atoms) was found.

The above mentioned patent application also discloses polymers, obtained from ethylene monomers, which are substituted in the 1 and 2 positions. These polymers are obtained from monomeric compounds of the formula $$R^I\text{—CH}=\text{CH—OR}^V$$

wherein $R^I$ and $R^V$ are aliphatic, cycloaliphatic or aromatic groups.

From the trans isomer form of these monomers, crystalline polymers are obtained which are acknowledged to have a "threo-di-isotactic" structure (i.e., a structure wherein if a portion of the main chain of the polymer is represented as being stretched in a zig-zag fashion on a plane, all the $R^I$ and $OR^V$ substituents lie on the same side of this plane).

It has now surprisingly been found by applicants that it is also possible to polymerize, in the presence of cationic catalysts having a stereospecific catalytic activity, monomers of the formula $$X\text{—CH}=\text{CH—OR},$$

wherein X is a halogen atom and R is an aliphatic, cycloaliphatic or aromatic group, either substituted or unsubstituted, and containing up to 10 carbon atoms, thus obtaining high molecular weight polymers having a high steric regularity and which polymers are demonstrated to be crystalline by X-ray examination.

An object of the present invention is therefore to provide a process for polymerizing monomers of the following Formula A:

(A)          X—CH=CH—OR wherein X is a halogen atom and R is an aliphatic, cycloaliphatic or aromatic group, either substituted or unsubstituted, and containing up to 10 carbon atoms, to high molecular weight polymers possessing a high steric regularity. This process is characterized by the fact that the polymerization is carried out in the presence of a catalytic system comprising one or more compounds of the following Formula B:

(B)          $MeX_n^1Y_m(Z)_p$ wherein Me represents an element belonging to the 3rd, 4th or 5th groups of the Periodic Table according to Mendeleef, $X^1$ is a halogen atom, Y is an alkyl, alkoxy or an alkanoic group, Z is basic organic compound according to the Lewis theory of acid and bases, m and n are zero or whole numbers, $m+n$ is equal to the valence of Me, and p is zero or a whole number.

The polymerization is carried out, in general, in the presence of an inert solvent at a temperature between 20° and —120° C., preferably between —50° and —100° C. Any inert solvent which does not react with either the catalyst or the monomer to be polymerized may be used, such as hexane, heptane and other aliphatics, cycloaliphatics and aromatics such as toluene, etc.

The catalyst is preferably employed in amounts between 0.1% and 20% with respect to the monomer.

Among the compounds of Formula B, which are found to be particularly active in the polymerization of the halogenated unsatured ethers, according to the present invention, are: dialkyl aluminum monohalides, such as diethyl aluminum monochloride or -monobromide, monoalkylaluminum dihalides, such as monoethyl aluminum dichloride or -dibromide, boron trifluoride etherates, titanium zirconium and vanadium di-halogen dialkoxides, such as titanium dibutoxy dichloride, zirconium and vanadium dibutoxy dichloride, titanium, zirconium and vanadium dihalogen-diacetates, titanium dihalogen-dicyclopenta-dienyls and their complexes with alkyl aluminum compounds, alkyl aluminum halides and aluminum trichloride.

Some examples of monomers of Formula A which are given as illustrative, not limiting of the present invention, are the following:
β-chlorovinyl-methyl-ether,
β-chlorovinyl-ethyl-ether,
β-chlorovinyl-isopropyl-ether,
β-chlorovinyl-butyl-ether,
β-chlorovinyl-isobutyl-ether,
β-chlorovinyl-cyclohexyl-ether,
β-chlorovinyl-benzyl-ether,
β-bromo-vinyl-methyl-ether,
β-brome-vinyl-ethyl-ether,
β-bromo-vinyl-isobutyl-ether,
β-bromo-vinyl-tolyl-ether,
β-bromo-vinyl-cyclohexyl-ether,
β-bromo-vinyl-phenyl-ether,
β-iodo-vinyl-methyl-ether,
β-iodo-vinyl-ethyl-ether, etc.

A further object of the present invention is therefore to provide for the obtaining of high molecular weight generally crystalline polymers, having a high regularity of steric structure, obtained from monomers of the general formula (A)          X—CH=CH—OR wherein X represents a halogen atom and R is an aliphatic, cycloaliphatic or aromatic group, substituted or unsubstituted, and containing up to 10 carbon atoms.

The monomers of this Formula A, such as, e.g., β-chloro- (or respectively bromo-, iodo-) -vinyl-alkyl (or aryl, cycloalkyl, aralkyl) ethers, which can also be defined as 1-chloro- (or bromo-, iodo-) 2-alkoxy- (or aryloxy, cycloalkoxy, arylalkoxy) ethylenes, can exist in two stereoisomeric cis and trans forms, and therefore, according to what has been disclosed in Italian Patent No. 599,950, can give, upon stereospecific polymerization, different polymers having different sterical structure.

It should be kept in mind that in the polymers derived from non-cyclic disubstituted ethylenic monomers, three simple stereoregular structural forms can be predicted, namely, threo-di-isotactic, erithro-di-isotactic and di-syndiotactic.

The di-isotactic structure has been defined above. Analogously, di-syndiotactic can be defined as a structure in which steric orders of the syndiotactic type can be recognized for each series of differently substituted tertiary carbon atoms.

The prefixes erithro- and threo- were introduced in order to distinguish the two possible types of di-isotactic structures and are used according to the normal meaning of such terms (according to Newman, M. S.: "Steric Effects in Organic Chemistry," New York 1956). Thus, on page 10, "erithro" is defined as the diastereoisomer which, when observed in the Newman projection in one of its eclipsed forms, presents at least two series of equal or similar substituents as superimposed, while as "threo" is defined the opposite isomer.

Figure 1B:
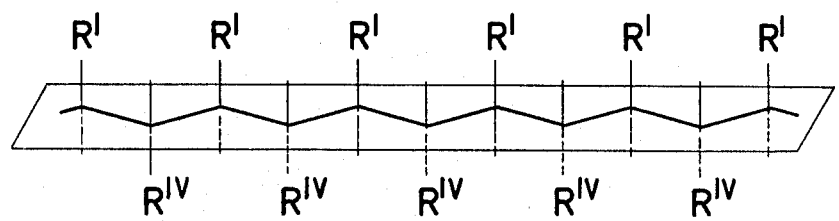
Figure 1C:
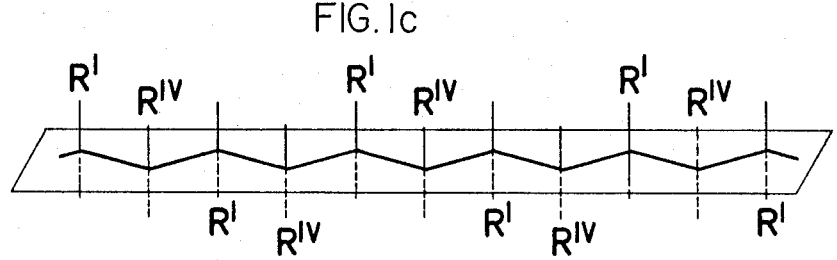
Figure 2A:
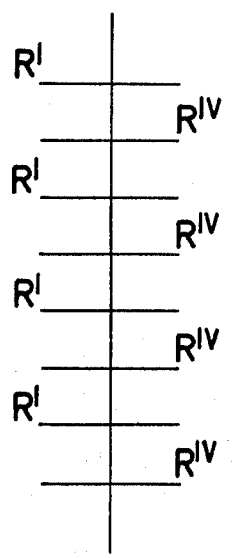
Figure 2B:
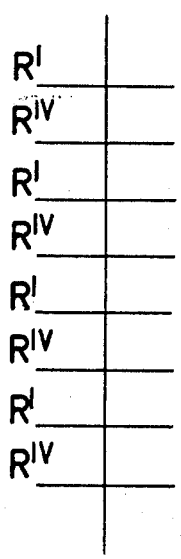
Figure 2C:
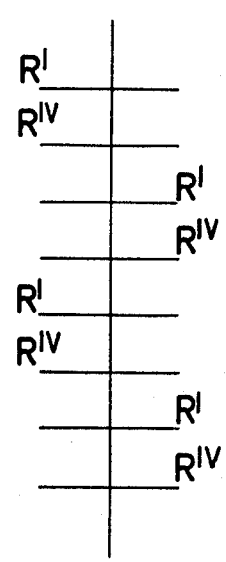

The threo-di-isotactic, erithro-di-isotactic and di-syndiotactic structures are represented in FIGURE 1 as $a$, $b$ and $c$, respectively, by arbitrarily stretching the main chain of the polymer in a zig-zag manner on a plane. In FIGURE 2, $a$, $b$ and $c$, respectively, show the three forms in the Fischer projection. In both figures the side substituents are designated as $R^I$ and $R^{IV}$.

It has also surprisingly been found that not only do the polymers derived from the trans form of the monomer present a crystallinity when extruded into fibers and subjected to stretching, but those polymers derived from the cis form also do.

Another interesting fact is that the two crystalline polymers, one obtained from the cis isomer and the other from the trans isomer, form of β-chloro-vinyl-butyl ether, are different from each other, since they each present different infrared and X-ray spectra.

The polymer of trans-β-chloro-vinyl-isobutyl ether has been demonstrated to have a structure of the threo-di-isotactic type. The stretched fibers obtained from this polymer, upon X-ray examination, possess an identity period of about 20.8 A. and a spiralized chain of the 10/3 type, i.e., with 10 monomeric units every 3 spiral rounds.

The polymer of trans-β-chloro-vinyl-n-butyl ether has been demonstrated to have a structure of threo-di-isotactic type, and the chain possesses in the crystalline state an identity period of 6.5 A. and a spiralized chain of the 3/1 type.

The polymer of cis-β-chloro-vinyl-n-butyl ether possesses on the contrary a spiralized chain of the 4/1 type with an identity period of 8.6 A. This type of chain corresponds, on the basis of thermodynamic calculations, to an erithro-di-isotactic structure.

The halogenated polymers obtained according to the present invention are thermoplastic, and possess a high melting point. Upon cooling, the melted polymer can be transformed again into crystalline form, with the crystallinity depending on the duration and the conditions of the annealing process. The polymers of the present invention give stretch-oriented films and fibers possessing good mechanical and thermal characteristics and also possessing a combination of interesting properties from the technical point of view. These polymers possess a remarkable transparency, which is not frequently found in the case of crystalline polymers having a high melting point. These crystalline polymers can also be used in the manufacture of plastic materials by employing normal processes of die-casting, injection molding, extrusion, lamination, etc.

In order to obtain highly crystalline polymers having a very regular sterical structure, it is necessary to use monomers in their purse stereoisomeric forms, or at least use mixtures of monomers possessing a high concentration (>90%) of one of the two isomers and then carefully purifying the monomers before use.

When using cis-trans monomer mixtures, polymers of less regularity from the steric point of view, and possessing a lower crystallinity, are obtained.

By varying the steric regularity, it is possible to obtain corresponding variations in the physical and mechanical properties (e.g., melting point, hardness, etc.). It is thus possible to produce a very wide range of useful products for various applications.

The polymer fractions, having higher steric regularity, can be separated from the prevailingly atactic or slighlty crystalline fractions by extraction with either cold or boiling solvents.

The following examples are given to illustrate the present invention and are not to be considered as a limitation thereof.

*Example 1*

5.6 g. of β-chlorovinyl-butyl-ether, containing 96% of the cis isomer, are polymerized at −78° C. in an inert atmosphere in the presence of 0.25 ml. of $Al(C_2H_5)Cl_2$ while using 40 cc. of toluene as solvent.

After 15 hours, the polymer is coagulated with methanol. A white fibrous solid (5.6 g.) is thus obtained from which solid laminae and fibers are easily obtained. A stretched fiber of this material possesses a high crystallinity as demonstrated by X-ray examination.

The intrinsic viscosity of the polymer product, determined in toluene at 30° C., is 0.8×100 ml./g., and its melting point is greater than 200° C.

A lamina, pressed at 220° C., possesses the following characteristics:

Rockwell hardness, R scale at 20° C. _____ 45
Tensile strength at 23° C. _____kg./cm.² __ 320

*Example 2*

2.5 g. of β-chloro-vinyl-butyl-ether (96% trans isomer) are polymerized in the manner described in Example 1.

2.3 g. of a polymer, which is demonstrated to be crystalline by X-ray examination and which is different from that obtained in Example 1, are obtained. The polymer obtained has an intrinsic viscosity (determined in toluene at 30° C.) of 0.64.

*Example 3*

The polymerization is carried out as in Example 1, but using instead 2.7 g. of β-chloro-vinyl-isobutyl-ether (97% trans isomer).

2.7 g. of a crystalline polymer, having an intrinsic viscosity of 0.66 (determined in toluene at 30° C.), are obtained.

*Example 4*

The polymerization is carried out as in Example 1, but using instead 7.0 g. of β-chloro-vinyl-isobutyl-ether (95% cis isomer).

6.5 g. of a crystalline polymer, having an intrinsic viscosity of 0.40 (determined in toluene at 30° C.), are obtained.

*Example 5*

The polymerization is carried out as in Example 1, but using instead 2.4 g. of β-chloro-vinyl - ethyl - ether (98% cis).

2.3 g. of polymer, having an intrinsic viscosity of 0.59 (determined in toluence at 30° C.), are obtained.

Example 6

The polymerization is carried out as in Example 1, but using instead 1.3 g. of β-chloro-vinyl-ethyl-ether (97% trans isomer).

1.2 g. of a polymer, having an intrinsic viscosity of 1.39 (determined in toluene at 30° C.), are obtained.

Example 7

The polymerization is carried out as in Example 1, but using instead 8.0 g. of β-bromo-vinyl-methyl-ether in the presence of 0.2 ml. of Al($C_2H_5$)$_2$Cl.

There is obtained 6.1 g. of a polymer.

Example 8

The polymerization is carried out as in Example 1, by polymerizing 6.0 g. of β-chloro-vinyl-isobutyl-ether in the presence of 0.25 ml. of $BF_3 \cdot O(C_2H_5)_2$.

4.7 g. of white polymer are obtained.

Example 9

The polymerization is carried out as in Example 1, by polymerizing 1.6 g. of β-chloro-vinyl-ethyl-ether (97% trans isomer) in the presence of 1 ml. of Al($C_2H_5$)$_2$Cl.

50 mg. of a crystalline polymer are obtained.

Many modifications and other variations can, of course, be practiced without departing from the spirit of the present invention.

Having thus described the present invention, what it is desired to claim and secure by Letters Patent is:

1. A process for preparing high molecular weight polymers which comprises polymerizing a monomer of the formula $$X—CH=CH—OR$$

wherein X is a halogen atom and R is selected from the group consisting of aliphatic, cycloaliphatic and aromatic groups, containing up to 10 carbon atoms; said monomer being selected from the stereo group consisting of the cis form, the trans form, and mixtures thereof wherein one of said forms constitutes over 90 percent by weight of said mixture, said polymerization characterized by being carried out with a catalytic system comprising at least one compound of the formula $$MeX_n^1Y_m(Z)_p$$

wherein Me is an element selected from the group consisting of the 3rd, 4th and 5th groups of the Periodic Table according to Mendeleef, $X^1$ is a halogen, Y is selected from the group consisting of alkyl, alkoxy and alkanoic groups, Z is a basic organic compound according to Lewis theory, n and m are selected from group consisting of zero and whole numbers, m+n is equal to the valence of Me, and p is selected from the group consisting of zero and whole numbers.

2. The process of claim 1, further characterized in that it is carried out at a temperature between 20° and —120° C.

3. The process of claim 1, further characterized in that it is carried out at a temperature between —50° C. and —100° C.

4. The process of claim 1, further characterized in that it is carried out in the presence of at least one inert solvent.

5. The process of claim 4, further characterized in that the solvent is toluene.

6. The process of claim 1, further characterized in that the catalyst is employed in amounts between 0.1 and 20% by weight of the monomer.

7. The process of claim 1, further characterized in that the catalyst is mono-ethyl aluminum dichloride.

8. The process of claim 1, further characterized in that the catalyst is diethyl aluminum monochloride.

9. The process of claim 1, further characterized in that the catalyst is boron tri-fluoride etherate.

References Cited by the Examiner

UNITED STATES PATENTS

| | | | |
|---|---|---|---|
| 3,009,908 | 11/1961 | Anderson | 260—91.1 |
| 3,023,198 | 2/1962 | Nowlin | 260—91.1 |
| 3,098,061 | 7/1963 | Heck | 260—91.1 |
| 3,117,112 | 1/1964 | Mirabile et al. | 260—88.7 |

FOREIGN PATENTS 599,950  11/1959  Italy.

OTHER REFERENCES

M. F. Shostakovskii and F. P. Sidel Kovskaya: Izvest. Akad. Nauk SSSR, Otdel Khim Nauk, 1950, 394–401.

Japanese Patent Number 158 (1958), abstracted in C.A. 52; p. 19953g (1958).

JOSEPH L. SCHOFER, *Primary Examiner.*

HAROLD N. BURSTEIN, *Examiner.*

W. G. GOODSON, M. B. KURTZMAN,
*Assistant Examiners.*